April 23, 1929.   G. G. EARL   1,710,301
APPARATUS AND PROCESS OF STERILIZING FLOWING WATER
Original Filed July 8, 1916   3 Sheets-Sheet 2

INVENTOR
George G. Earl
BY
Richey, Slough & Watts
his ATTORNEYS.

April 23, 1929.  G. G. EARL  1,710,301
APPARATUS AND PROCESS OF STERILIZING FLOWING WATER
Original Filed July 8, 1916   3 Sheets-Sheet 3
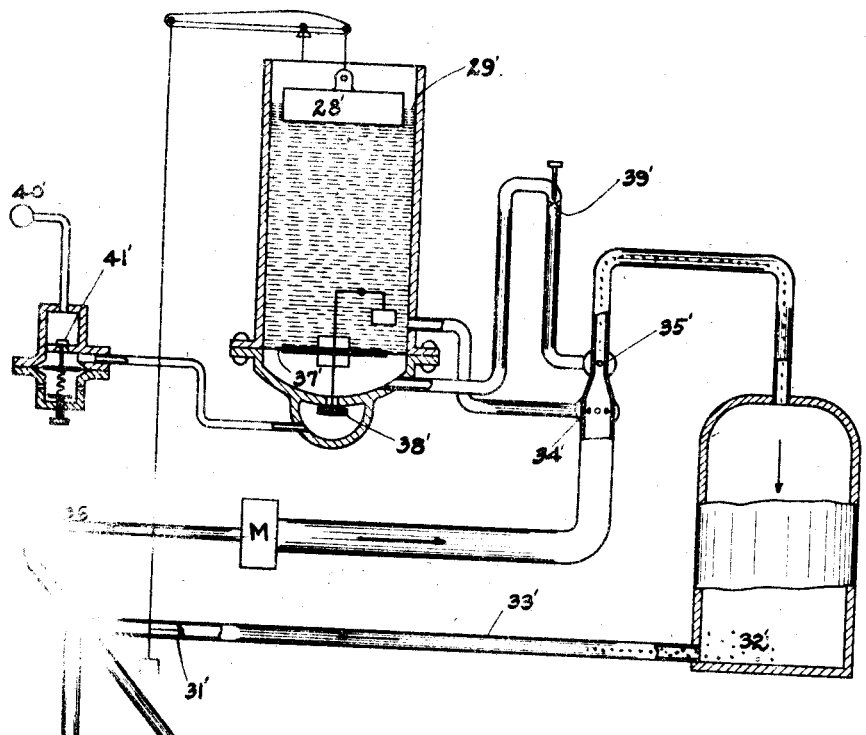
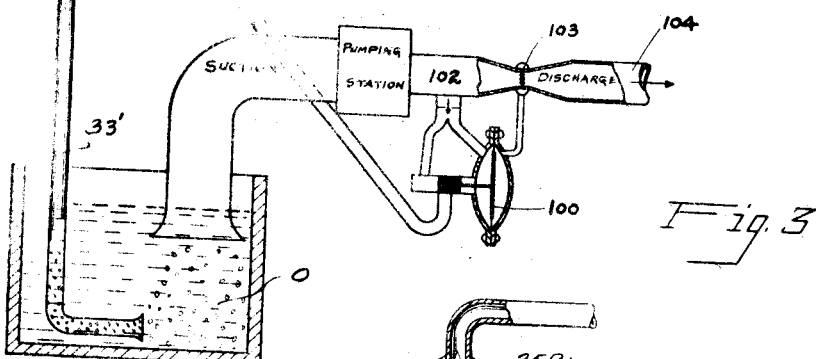
Fig. 3
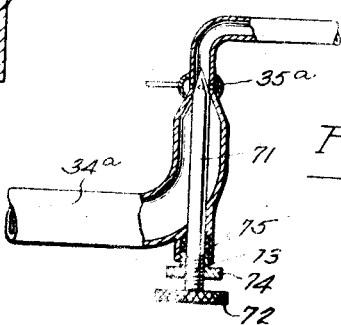
Fig. 4
INVENTOR
George G. Earl
BY
His ATTORNEYS.

Patented Apr. 23, 1929.

1,710,301

UNITED STATES PATENT OFFICE.

GEORGE GOODELL EARL, OF NEW ORLEANS, LOUISIANA, ASSIGNOR OF ONE-THIRD TO CHARLES ARTHUR BROWN, OF LORAIN, OHIO, AND ONE-THIRD TO ALBERT BALDWIN WOOD, OF NEW ORLEANS, LOUISIANA.

APPARATUS AND PROCESS OF STERILIZING FLOWING WATER.

Original application filed July 2, 1916. Serial No. 103,171. Divided and this application filed August 9, 1924. Serial No. 731,092.

My invention relates to apparatus for and the process of water sterilization and particularly to the process which permits a flow of liquid like water to be sterilized by the addition of a proportional amount of a sterilizing fluid which must be regulated as a gas flow and delivered into and commingled with the water flow to be sterilized in the most effective manner.

The common practice in water sterilization has been by the preparation of a solution in a vented or open container, of chlorine gas or of some substance giving off or containing chlorine gas, and the addition of this solution to the water to be treated; because of the objectionable odors and great loss of efficiency resulting when large quantities of solution were made up, the next step was to arrange to make up this solution continuously by adding chlorine gas to a minor flow of water and passing these flows through a ventilated saturator containing porous material, which permitted any undissolved chlorine or any gaseous products of the solution of chlorine in water to escape to the atmosphere, but stored so small an amount of the solution, so short a time, that at least a relatively fresh and constant strength solution was supplied to the water to be treated; however, always it was a solution which was completed and from which any gaseous products arising from the completed solution or any undissolved gas had escaped to atmosphere through the vented saturator, creating objectionable odors and to a large degree decreasing the efficiency of sterilization from a given amount of gas.

The process of sterilization by the action of chlorine would be at its maximum of efficiency if the chlorine gas as a gas could be so distributed through the whole body of water to be sterilized that all of the products of its solution at the instant of their formation came into intimate contact with the water to be treated. The dissemination of chlorine gas into water to be treated, as a gas, has not been found a satisfactory or practicable method, however, because of the difficulty of complete distribution and solution by this method.

In my improved system for water sterilization, I establish a small flow of water which may be set at any desired rate, or automatically controlled in such a way as to be made proportional to the main flow of water to be sterilized, and, governed by said small flow of water, I add thereto a proportional flow of chlorine gas in any desired proportion. I carry this mixture while the gas is in process of solution together with all gaseous products of said solution through an unvented system, from which no gases can escape except through the discharge conduit therefor and into which only the commingled particles of gas and the small flow of water can be admitted directly to, and distribute it through, the water to be treated.

One object of my invention is to provide the most efficient utilization of the chlorine gas for sterilization.

Another object of my invention is to prevent the objectionable and injurious results of escaping chlorine gas or products of solution of chlorine gas, from open tanks or ventilated systems, from which such gases may escape.

Another object of my invention is to produce a constant mixture of water and chlorine gas automatically which mixture may be made proportional in any predetermined proportions, and to provide the best possible condition of that mixture when it enters the water to be treated.

Another object of my invention is to provide automatic means to regulate the flow both of chlorine gas and of water carrying said gas proportional to the flow of water to be treated.

Another object of my invention is to provide means whereby the regulation of the gas flow is a definite regulation in pounds of gas because its flow regulation operates at a constant pressure of the gas to be regulated on one side of the orifice or restriction through which such regulation is effected.

Other objects of my invention and the invention itself will become apparent as the description of embodiments thereof progresses, reference being had to drawings illustrating the principles of my invention.

Referring now to the drawings.

Figure 1:
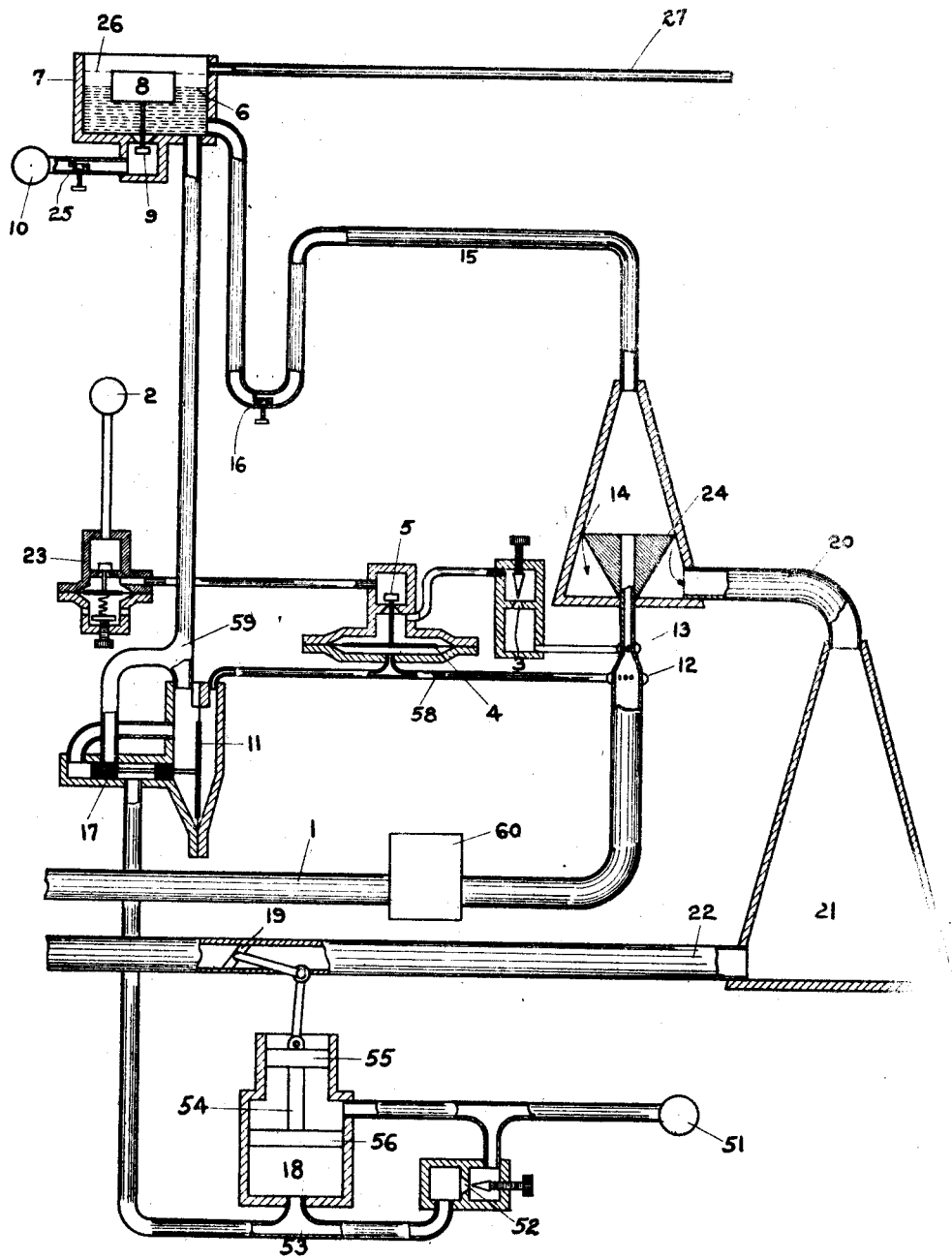
Fig. 1 shows one embodiment of my invention.
Figure 2:
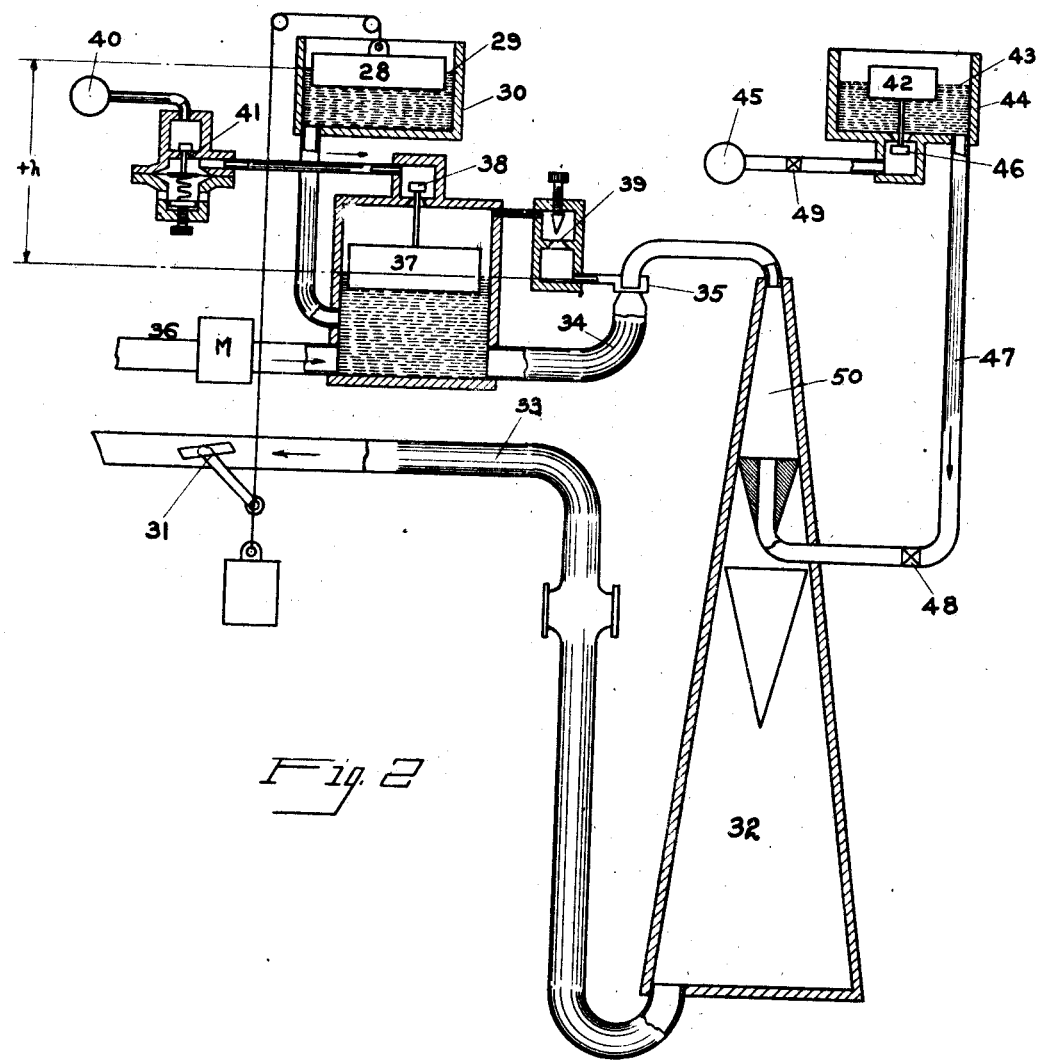
Fig. 2 shows another embodiment of my invention.

Fig. 3 shows a combination of parts taken from Fig. 1 and Fig. 2, with certain parts omitted, and illustrates the combination of elements which have appeared to be important for securing the most efficient operation of the system of my invention when it is desired to sterilize a large flow of water which in an assumed case may range from a 20 to a 70 million gallon rate of flow and averaging a 40 million gallon rate, with an average rate of chlorine feed of about 1½ pounds per million gallons of water treated; and Fig. 4 shows a conventional form of restriction adapted to be substituted for a restriction as illustrated in the other figures.

Referring to Fig. 1—A flow of water which may be regulated to any desired rate of flow or made proportional to the flow of water to be treated enters the system at 1 and may be recorded by a meter 60, and passes through the approach 12 to the restriction 13 and creates a difference between the pressure at such approach and such restriction which is proportional to the square of the amount of water passing. The pressure at the approach 12 is communicated by the pipe 58 to the under side of the diaphragm 4 which is shown as being horizontal and may be level with the restriction 13 and also to the right hand side of the diaphragm 11.

The function of pipe 27 is to waste any water which may accumulate in chamber 7 above the level 26, which is just above the level 6 which in this case is the constant pressure dominating both the water pressure at the approach 12 to the restriction 13 and the chlorine pressure on the approach side of the chlorine orifice 3. The overflow to waste is a provision to prevent any material excess over the pressure due to the level 6, as in the event of the closure of valve 16. The purpose of the trap or depression in the pipe 15, in which the valve 16 is placed, is to avoid any possible venting or escape of chlorine or the gaseous products of its solution to atmosphere.

The diaphragm 4 operates to open and close the valve 5 and thereby to maintain a pressure of chlorine gas over diaphragm 4 and acting upon the approach side of chlorine orifice 3 equal to the water pressure at the approach 12 above the level of the diaphragm 4; this is also the level of the restriction 13 and these conditions result in a flow of gas through the orifice 3 proportional to the flow of water through the restriction 13; since the orifice 3 or the restriction 13, see Fig. 4, may be adjustable, the proportion of gas to water may also be adjustable. Referring to Fig. 4, the orifice 13 of Fig. 1, as well as the orifices 35 and 35′ of Figs. 2 and 3, respectively, may be made adjustable in the manner shown in Fig. 4 or in any other well-known way. In Fig. 4, the orifice is shown at 35ª in a conduit having an approach portion 34ª, these corresponding to the orifice and conduit approach 35 and 34 of Fig. 2 and the corresponding elements of the other figures. At 71, Fig. 4, I show an adjustable pointed rod having a knurled handle 72 insertable into the conduit with the pointed portion projecting axially of and into the orifice and adapted to be reciprocated to a greater or less degree therein by virtue of the screw threads 73 engaging the screw threaded jam nut 74 for the packing gland 75.

The chlorine supply comes from the pipe 2 and may be cut down to any desired nearly constant pressure by the pressure reducing valve 23, so that very little pressure absorption is required to be effected by the valve 5 and it can therefore work with great accuracy in producing a chlorine pressure over diaphragm 4 equal to the water pressure under said diaphragm. The proportional mixture of chlorine and water entering the chamber 14 in this embodiment is met by a counter flow of water due to a constant pressure of water at the constant level 6 maintained by the float 8 admitting additional water from the source of water supply 10 through the valve 9 actuated by the float 8; whenever the level 6 is lowered due to water leaving the container 7 by way of the duct 15, the valve 9 is reopened to admit additional water from the source 10, under pressure, and through the orifice 25, to restore the level in the container 7 and raise the float 8 to close the valve 9.

This constant pressure due to level 6 also acts on the left hand side of the diaphragm 11 and through the action of the valve 17 operated by the diaphragm 11 permits or cuts off flow from the source of water pressure 51 through the orifice 52, thereby operating the valve 19 governing the flow from the chamber 21 through the discharge conduit 22 to maintain the pressure at the approach 12 to the restriction 13 equal to the pressure due to the constant water level 6.

It will be understood that the source of water under pressure shown at 10 will be such as to at all times contain water under a pressure value greater than the value due to the level of the water in the container 7 and also the source of gas 2 will contain chlorine gas under a higher pressure than any pressure which may at any time be exerted by the water contained in the chamber under the diaphragm 4. The above should be true in both cases, and that after these pressures from these sources are cut down by the automatically operating regulating valves 9 and 5, respectively, the fluids passing these valves on the discharge side thereof, although reduced in pressure by the action of the valves and the orifices, are still of a pressure as great as that required by the demands of the system.

The water pressure under diaphragm 4 is therefore maintained constant and the gas pressure over said diaphragm is maintained equal to said constant water pressure, and this equality of constant gas and water pressure may be made at the level at which the gas and water flow unite, the reduction of water pressure at the restriction 13 and of said gas pressure on the discharge side of the orifice 3 being proportional to the square of the amounts of gas and water passing said orifice and said restriction, we have proportional flows by a regulation based upon a constant pressure approach or meeting point of gas and water which alone can produce definite regulation of pounds of gas proportional to a water flow, the combined flows of chlorine gas and water entering the conduit 1 and 13 and 12, respectively, pass through the chambers 14 and 21 into a discharge conduit 22 and then past the automatically adjustable valve 19 to the main body of water to be sterilized.

Fig. 2 shows another preferred form of my invention. A flow of water set at any desired rate or made proportional to the flow to be treated enters the system at 36, may be metered at M and passes the restriction 35, then downward through the chambers 50 and 32 escaping through the pipe 33 and the valve 31 until the water entering at 36 has filled the system to a point which lifts the float 28. The valve 31 is otherwise adapted to be closed by the weight of said float; thereafter the float 28 operates the valve 31 to maintain the constant pressure due to water level 29 on the pipe 34 approaching the restriction 35.

The float 37 operating the valve 38 cuts off any chlorine supply from the source of chlorine supply 40 to the area above said float until the water level around said float rises to the level of the restriction 35; any further rise of water level around the float 37 admits chlorine through the valve 38 to maintain a pressure in the area above the float equal to the water pressure sustaining said float; the action of a constant level float or of a horizontal diaphragm each at the level of a restriction being the same and being competent at said level of maintaining equal pressures of a gas and of a liquid opposed to one another at said level, and therefore of regulating either the gas flow or the liquid flow approaching a junction at such restriction to maintain said flows proportional to one another.

In Fig. 2, a constant pressure of water due to the level 29 acts upon the restriction 35 and is forcing a water flow through said restriction; an equal pressure of gas measures from the level of the junction of the gas and water flow is acting upon the approach to the chlorine orifice 39 and the two flows are uniting at a common lower pressure at the restriction 35, the restrictions 35 being like that illustrated at 13, Fig. 1. It will be understood that the pressure of the chlorine gas contained in the space above the float 37 in the containing chamber will be sufficient to prevent the water carrying such float from so rising around the float so to pass through the chlorine orifice governed by the float 38 and thence through the pipe to the chlorine supply at 41. The surface of the water and the exposed area of the float comprise an area of equal opposed pressures just as the diaphragm 4 of Fig. 1 comprises such an area. The flows are therefore proportional and the gas flow being regulated to a constant pressure approaching the orifice 39 produces a proportional regulation in pounds of gas instead of only in cubic feet thereof as would be the case if the regulation were at a varying pressure. The portion of Fig. 2 represented by the Figures 42 to 49 inclusive shows a method whereby any desired amount of additional water flow may be added to facilitate solution and movement as follows: A source of water supply 45 supplies a constant pressure in the tank 44 to any desired level, regulated by the float 42, and the valve 46 constituting a constant pressure valve, and the pipe 47 which has a valve 48 to regulate the flow therefrom supplies any additional flow desired either for agitation or dilution to promote solution and conveying forward of mixture. Obviously the chamber 32 may be of any size and shape desired and the amount of dilution or additional flow, regulated by the valve 48 may be anything from 0 to its full capacity. There is no point anywhere at which the chlorine or any of its gaseous products of solution can escape or air can enter and the object of my invention is to pass the mixture in the most effective form to the water to be treated through the outlet pipe 33.

Fig. 3, wherein parts are numbered to correspond with those in Fig. 2, so far as its parts correspond therewith, shows an adaptation of this system which gives excellent service.

In Fig. 3 a flow of water proportional to the flow to be treated enters at 36', passes the meter and the restriction 35' and thence through the chamber 32', the pipe 33' and valve 31', to the water to be treated at O. The valve 31' is governed by the float 28' to maintain a level 29' about said float and therefore this amount of constant pressure against the diaphragm 37 which is level with the restriction 35', and which operates the valve 38' to maintain an equal constant pressure of chlorine under said diaphragm and acting on the approach to the chlorine orifice 39'. Fig. 3, therefore, shows the system of Fig. 2, except that I have substituted the diaphragm instead of the constant level float 37 of Fig. 2, and have omitted all arrangements to provide any additional flow other than that to which chlorine is added. Using this system fine bubbles of gas are always escaping through the pipe 33' which are visible in the large bottle 32' and are descending and escaping into pipe 33' but when I discharge this mixture of water and gas bubbles into a large body of flowing water to be sterilized at O and well below its surface, the mixture commingles with the flowing water and enters rapidly into its reactions therewith, which are completed therein without any sign or odor of escaping chlorine gas over said water surface at O, whereas I have found that any venting of the mixture being discharged at O would give off chlorine fumes and fumes resulting from the solution of chlorine occurring in the water which are objectionable, being injurious to metallic structures, and constitute a most wasteful escape of the elements which are effective in sterilization.

Fig. 3 shows also a system by which I have produced a proportional flow to the main flow to be sterilized using the equal pressure diaphragm 100 to maintain a pressure on the discharge side of orifice 101 equal to the pressure in the restriction 103 of the approach-throat-recovery combination 102—103—104, and thereby producing a flow through the orifices 101 which is piped to 36' which is proportional to the main flow from the pumping station, and which automatically receives at 35, a proportional supply of gas, and returns to the suction well of the pump or pumping station; giving therefore a dosing of gas to the water being pumped which varies accurately and instantly proportional thereto.

It will be understood that although the conduits 1 and 22 of Fig. 1, 36 and 33 of Fig. 2, 36' and 33' of Fig. 3 and 36ª and 33ª of Fig. 4 may be taken as the main conduits, inlet and discharge of a water system, that preferably the arrangement now shown in the figures, exclusive of Fig. 3, may be like that illustrated in Fig. 3, where the main body of water to be treated is a conduit or reservoir O and the inlet and discharge conduits above enumerated will correspond to those illustrated at 36' and 33' of Fig. 3 and merely convey a minor flow of water, together with chlorine gas, to the larger body of water shown at O to be treated, and in which case a conduit 102—104 may lead from such a reservoir to the water consuming points of the system. Preferably the arrangement will be as shown in Fig. 3. In special cases it may be otherwise. Both arrangements are contemplated herein.

I may have many diaphragms 100 drawing flow from many pumps and all of them discharging into one common pipe line 36. It will be understood that the sources of water supply shown at 10, 51, 49, 45, 40' and at other points in the different figures of drawing are from water under pressure to be drawn from a source of water supply and conveyed by ducts to the system of my invention, that these sources may be separate or the water may be drawn from the same source, it only being necessary that in any case the water pressures be sufficient to supply the water flows described and as governed in the operation of my system. I may use orifices or other forms of discharging members with equal pressure diaphragms to produce my proportional flows, or I may use other methods of producing proportional flows at 36, or I may set any desired rate of flow thereat, in various known ways, or govern the flow approaching it in many different desired ways, as for such a purpose I can use means already described in my prior patents, and applications previously filed by me; I have not, therefore, repeated the many ways of governing functional or proportional or set rate flows applicable to dominate the rate of flow at 36 and shown either in my co-pending application, Serial No. 108,171, filed July 8, 1916, of which this case is a division, or in my other prior patented cases, or pending applications in which I have covered such methods or apparatus for the government of fluid flow, or in the prior art, patented, published, or in actual use. Some of these methods are described in my co-pending application, Serial No. 251,662, and in divisions thereof. In Fig. 3, I show one arrangement taking care of what I consider to be the most difficult of all such governments, viz—an automatic proportional flow of gas, in pounds of gas, to a small flow of water which is itself proportional to a large flow of water to be sterilized.

Having now described my invention in a preferred embodiment and in several modified forms thereof, I am aware that numerous and extensive departures may be made from the embodiments herein illustrated and described, but without departing from the spirit of my invention.

I claim:—

1. In a gas and liquid contact system, the process which comprises establishing a minor flow of water separate from a main flow, inducing a proportional flow of a gas exerting a pressure in excess of atmospheric pressure, uniting the said proportional gas flow with such minor flow in a portion of its path, and causing the said minor flow to convey out of contact with air, all of such gas partly in solution and partly in the form of gas bubbles to the main body of flowing water.

2. In a gas and liquid contact system, the process which comprises establishing a minor flow of water separate from a main flow, inducing a separate flow of a gas exerting a pressure in excess of atmospheric pressure, proportional to the said minor flow, in bringing the said flow of gas and the said minor water flow together, maintaining the combined flows out of contact with air and then adding same to the main body of water.

3. In a gas and liquid contact system, the process which comprises establishing a minor flow of water separate from a main flow, in inducing a separate flow of a gas exerting a pressure in excess of atmospheric pressure proportional to the said minor flow, in bringing the said flow of gas and the said minor water flow together at a point of constant pressure to cause a physical mixture of the said gas with the said minor water flow and in then conveying the said mechanical mixture to the main body of flowing water, the mixture being substantially entirely conveyed entirely out of contact with air.

4. In a gas and liquid contact system, the process which comprises establishing a minor flow of water separate from a main flow, in establishing a flow of a gas exerting a pressure in excess of atmospheric pressure and maintaining the flow of gas and the minor flow of water at a given predetermined constant pressure, uniting said flows at constant pressure and conveying the gas in the said minor flow from the point where the flows are united to the main body of flowing water substantially entirely out of contact with air at all points in its path to the main body of flowing water.

5. In a gas and liquid contact system, first, the establishment of a minor flow of water separate from a main flow, second, in inducing a flow of a gas exerting a pressure in excess of atmospheric pressure, and physically uniting the gas flow and the minor water flow, and conveying a considerable portion of the gas undissolved to the main body of flowing water.

6. In a gas and liquid contact system, first, the establishment of a minor flow of water separate from a main flow, second, in inducing a flow of a gas exerting a pressure in excess of atmospheric pressure, then physically uniting the gas flow and the minor water flow, and conveying a considerable portion of the gas undissolved to the main body of flowing water out of contact with air to prevent loss or exposure to air of any of the gas and the products of solution prior to the introduction of the mixture to the main body of flowing water.

7. In a gas and liquid control system, the process which comprises establishing a minor flow of water separate from and proportional to a main flow of water, inducing a flow of gas proportional to the water flows, uniting the said proportional gas flow with such minor flow at a point of common pressure above atmospheric pressure in a portion of its path, and causing the said minor flow to convey the gas partly in solution and partly in the form of bubbles to the main body of flowing water out of contact with air so as to prevent the escape of any of the gas, and prevent exposure of the products of partial solution to the air.

8. In a gas and liquid contact system, a conduit for conducting a main flow of water, a source of gas at more than atmospheric pressure, a separate minor flow of water, means operable to mix said gas with minor flow of water in amounts proportional to the amount of water passing in the said minor flow, and air tight conduit means to carry said mixture entirely to, and disseminate it through, the water to be treated, said conduit means comprising a downward passageway with an outlet for flow, said passageway being of such area and shape whereby bubbles of the gas or of gaseous products of solution of said gas passed through it are so broken up by the downward flow of combined water and gas passing through the passageway that only bubbles of small size pass through the outlet of said passageway.

9. In a water supply system, a body of water adapted to be discharged to water consuming points thereof, means to produce a mechanical mixture of small bubbles of a gas with a small flow of water, said mixture being maintained at greater than atmospheric pressure, and unvented means to convey said mixture out of contact with air to, and to disseminate it through, the water to be treated.

10. In a liquid gas contact system, a main body of supply water, means to govern the rate of flow of a small flow of water, a source of gas supply under pressure, means to bring the pressure of said small water flow to a constant pressure at one point in its path, a valve, a movable member, means to govern the pressure of gas supplied from said source to maintain it at a constant pressure equal to the said water flow constant pressure at one point in its path by opposing said gas pressure against said constant water pressure, said movable member being responsive to variations in relative values of said opposed pressures at the point of opposition, to operate said valve, said valve being disposed in the gas line to control the flow therein, means to unite said flows at a common point of lower pressure, and air-tight means to carry the mixture of gas and water and all products of solution of said gas in water to the main body of water at which the mixture of gas and water is introduced, said gas and water and the mixture of gas and water being maintained at all points prior to introduction to the main body of water to be treated at a pressure in excess of atmospheric pressure.

11. In a system for the mixing of a gas flow in any desired proportion with a water flow, means including an equal pressure member and a valve operated thereby to maintain a constant pressure of water at one point approaching a pressure reducing restriction in said water flow, and an opening from a conduit supply gas entering said water flow at a point in its path after its pressure has been reduced by the effect of the restrictions, said restriction in said water flow, an equal pressure member in a horizontal position adapted to be affected by relative variations of a gas pressure and a water pressure reacting against one another at the level of said opening, a valve controlled by movements of said member in the gas supply line, maintaining a constant pressure of gas equal to the constant pressure of water maintained by said first named member, and reacting against said water pressure at the level of said opening, a resistance to flow in a conduit connecting said constant gas pressure to said opening, said pressures being in excess of atmospheric pressure.

12. In a water supply system, a duct conveying a large variable flow of water supplied thereto, means for discharging and disseminating a sterilizing gas into and through said large water flow, means to create a small water flow proportional to the large flow, means to mix a proportional amount of gas to said proportional water flow, means to convey substantially out of contact with air said mixture, including any gaseous products of the solution of said gas which may be in progress, together with all undissolved gas, to said disseminating and discharging means whereby it enters the said large flow, said pressures being in excess of atmospheric pressure.

13. In a gas and liquid mixing system, a chamber carrying water to be treated, means to supply a separate small flow of water, means to control the pressure of supplied water, a source of gas under pressure, means to govern automatically a flow of gas entering said water under pressure, said governing means comprising a valve and pressure responsive means responsive to differences of pressure of said supplied water and gas to render said pressures relatively commensurable, means for introducing the gas into the small water flow to make a mixture thereof and means to convey out of contact with air this mixture including undissolved gas and all the gaseous products of solution in progress, to the water carrying chamber, said pressures being in excess of atmospheric pressure.

14. In a system for the automatic regulation of a gas flow commensurable to a liquid flow for the addition of said gas flow to said liquid flow, means to maintain a constant pressure of said liquid at one point in its flow, means to maintain a constant pressure of gas flow at a fixed level of said liquid equal to said constant pressure of liquid and reacting against said liquid pressure and means to unite said gas and said liquid flows on the discharge side of or at restrictions through which said flows pass under said constant pressure at said fixed level, said pressures being in excess of atmospheric pressure.

15. The method of dispersing a gas flow into a main liquid flow for treatment of the liquid of said flow which consists in introducing said gas flow into a separate small flow of liquid and carrying the mixture thus produced through a closed system at a bubble carrying velocity to the liquid to be treated and introducing it to the liquid below the surface thereof.

16. The method of dispersing a gas flow into a main liquid flow for treatment of the liquid thereof which consists in introducing said gas flow into a separate small flow of liquid and causing the mixture thus produced to flow through a closed system at a bubble carrying velocity to the liquid of the main flow to be treated and introducing the mixture thereto at a submerged point therein the mixture in a portion of its path being caused to pass through a downward passageway adapted to limit the size of bubbles that can be passed downward therethrough for the range of velocity to be used therein.

17. The method of dispersing a gas flow through a liquid flow to be treated thereby which consists in causing the pressure at one point in the path of a small liquid flow to react against the pressure of a gas flow and utilizing the force of relative variations of the reacting pressure to regulate the pressure of the gas flow to cause it to be commensurable at one point in the path of said gas flow, and then uniting said gas and said small liquid flow and passing without contact with air, the mixture so formed at bubble carrying velocity through a system to a point submerged in the liquid flow to be treated.

18. The method of dispersing a gas flow through a liquid flow to be treated thereby which consists in maintaining a small liquid flow at a constant pressure at one point in its path, causing such constant pressure at a fixed elevation of said liquid to react against the pressure of a gas flow, to govern the gas flow and maintain a constant pressure of gas opposing said constant pressure of liquid at said fixed elevation and equal thereto and from said equal and constant pressure of gas and liquid drawing flows of gas and liquid through restrictions and uniting them after they have passed said restrictions and passing a mechanical mixture so formed, at bubble carrying velocity, through a system and out of contact with air to submergence in the flow to be treated.

19. The method of dispersing a gas flow through a liquid flow to be treated thereby which consists in regulating a small liquid flow to any desired rate, in bringing said liquid flow to a constant pressure at one point in its path, in causing said constant pressure at a fixed elevation of said liquid to react against a gas under pressure, in governing the gas flow to maintain a constant reacting pressure of gas equal to said opposed constant liquid pressure at said fixed elevation, and from said constant and equal pressures of gas and liquid drawing flows of gas through one restriction and liquid through another restriction and uniting said flows after they have passed said restriction, their point of junction being at the level of the fixed elevation aforesaid to effect a mixture comprising gas proportional to the small liquid flow through varying rates of said small liquid flow, and then in conducting the mixture thus formed at a bubble carrying velocity through a system and out of contact with air to submergence in the liquid flow to be treated.

20. The method of dispersing a gas flow through a liquid flow to be treated thereby and varying proportionally to the amount of liquid flow to be treated, which consists in providing a small flow of liquid proportional to the flow to be treated, adding thereto a proportional flow of gas, and conducting the mixture thus formed at a bubble carrying velocity to submergence in the liquid flow to be treated.

21. The method of governing a gas flow in pounds of gas which consists in governing a water flow, bringing said gas flow and said water flow at one point in their paths to a common constant pressure measured from a fixed elevation, by opposing said gas pressure against said liquid pressure at said fixed elevation and controlling the gaseous one of said flows by differences in the opposed pressures to prevent substantial variations between the two opposed pressures at the point of fixed elevation, of drawing a combined flow of gas and liquid from said point of common constant pressures through restrictions and uniting said flows at a level equal to said fixed elevation after they have passed said restrictions.

22. In a system adapted to regulate a gas flow by a water flow for the admixture of said flows, a constant level float valve to maintain a constant level of water at one point in said water flow by regulation by said valve of said water flow, another constant level float valve establishing another constant level of water by the regulation of the flow of gas to create an equal constant pressure of gas opposing said second constant level of water, and means including a restriction through which the gas escapes from said constant pressure, and another restriction through which the water flow passes, for the junction of said water and said gas flows, and unvented means including an auxiliary flow of water added to said mixture to deliver at bubble carrying velocity said combined fluids to a body of moving water to be treated by said mixture.

23. In a system for the mixing of a gas flow in any desired proportion with a water flow, means including a constant level float member and a valve operated thereby to maintain a constant pressure of water at one point approaching a pressure reducing restriction in said water flow, and an opening from a conduit supplying gas entering said water flow at a point in its path after its pressure has been reduced by the effect of the restriction, said restriction in said water flow, a constant level float member adapted to be affected by relative variations of a gas pressure and a water pressure reacting against one another at the level of said opening, a valve controlled by movements of said member in the gas supply line, maintaining a constant pressure of gas equal to the constant pressure of water maintained by said first named member, and reacting against said water pressure at the level of said opening an adjustable orifice in a conduit connecting said constant gas pressure to said opening.

In testimony whereof I hereunto affix my signature this 29th day of July, 1924.

GEORGE GOODELL EARL.